(12) United States Patent
Lin et al.

(10) Patent No.: US 12,367,205 B1
(45) Date of Patent: *Jul. 22, 2025

(54) MAINTAINING ARCHIVE AND CUT-OFF DATES FOR QUERYING A DATA STORE

(71) Applicant: SPLUNK INC., San Francisco, CA (US)

(72) Inventors: Elizabeth Lin, San Francisco, CA (US); Nils Petter Eriksson, Skellefta (SE); Ledion Bitincka, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/808,177

(22) Filed: Jun. 22, 2022

Related U.S. Application Data

(63) Continuation of application No. 17/080,067, filed on Oct. 26, 2020, now Pat. No. 11,416,505, which is a continuation of application No. 15/885,521, filed on Jan. 31, 2018, now Pat. No. 10,860,596, which is a continuation of application No. 14/815,734, filed on Jul. 31, 2015, now Pat. No. 9,916,367, which is a continuation-in-part of application No. 14/449,144, filed on Jul. 31, 2014, now Pat. No. 9,514,189, which is a continuation of application No. 14/266,832, filed on May 1, 2014, now Pat. No. 10,049,160, which is
(Continued)

(51) Int. Cl.
*G06F 16/00* (2019.01)
*G06F 16/2458* (2019.01)

(52) U.S. Cl.
CPC ................. *G06F 16/2471* (2019.01)

(58) Field of Classification Search
CPC ... G06F 16/2471; G06F 16/256; G06F 16/951
See application file for complete search history.

(56) References Cited

U.S. PATENT DOCUMENTS 6,446,062 B1   9/2002  Levine et al.
7,103,589 B1 * 9/2006  Kepler ............... G06F 16/2471
                                                    707/706
(Continued)

OTHER PUBLICATIONS

Bitincka, L., et al., "Optimizing Data Analysis With a Semi-Structured Time Series Database," pp. 1-9 (2010).
(Continued)

*Primary Examiner* — Farhan M Syed
(74) *Attorney, Agent, or Firm* — Shook, Hardy & Bacon L.L.P.

(57) ABSTRACT

In embodiments, a computer-implemented method may entail receiving a search request. A first data store and a second data store, that contains data archived from the first data store, may be identified. Data from the first data store may remain available in the first data store for a limited period of time once archived to the second data store. The first data store storing data in a first format and the second data store storing data in a second format, the first format and the second format being different from one another. Determining that a subset of data that has been archived into the second data store and is to be searched as part of the search request is still available from the first data store, and executing the search request on the subset of data utilizing the first data store. Additional embodiments are described and/or claimed.

20 Claims, 15 Drawing Sheets

Related U.S. Application Data a continuation of application No. 13/886,737, filed on May 3, 2013, now Pat. No. 8,738,629.

(56) References Cited

U.S. PATENT DOCUMENTS

| | | | |
|---|---|---|---|
| 7,246,210 B2* | 7/2007 | Georgis | G06F 11/1456 |
| | | | 711/111 |
| 7,631,019 B2* | 12/2009 | Schneider | G06F 16/2471 |
| | | | 707/999.203 |
| 7,937,344 B2 | 5/2011 | Baum et al. | |
| 8,112,425 B2 | 2/2012 | Baum et al. | |
| 8,214,338 B1 | 7/2012 | Kirchhoff et al. | |
| 8,341,142 B2 | 12/2012 | Sejnoha et al. | |
| 8,412,696 B2 | 4/2013 | Zhang et al. | |
| 8,478,616 B2 | 7/2013 | De Klerk et al. | |
| 8,589,403 B2 | 11/2013 | Marquardt et al. | |
| 8,682,925 B1 | 3/2014 | Marquardt et al. | |
| 8,751,529 B2 | 6/2014 | Zhang et al. | |
| 8,788,459 B2 | 7/2014 | Patel et al. | |
| 8,788,525 B2 | 7/2014 | Neels et al. | |
| 8,826,434 B2 | 9/2014 | Merza | |
| 9,124,612 B2 | 9/2015 | Vasan et al. | |
| 9,130,971 B2 | 9/2015 | Vasan et al. | |
| 9,164,998 B2* | 10/2015 | Klevenz | G06F 16/113 |
| 9,175,526 B2 | 11/2015 | O'Blenes | |
| 9,215,240 B2 | 12/2015 | Merza et al. | |
| 9,286,413 B1 | 3/2016 | Coates et al. | |
| 9,753,974 B2 | 9/2017 | Marquardt et al. | |
| 10,127,258 B2 | 11/2018 | Lamas et al. | |
| 2004/0078359 A1 | 4/2004 | Bolognese et al. | |
| 2004/0172385 A1 | 9/2004 | Dayal | |
| 2004/0225641 A1 | 11/2004 | Dettinger et al. | |
| 2005/0149584 A1* | 7/2005 | Bourbonnais | G06F 16/256 |
| 2005/0203876 A1 | 9/2005 | Cragun et al. | |
| 2006/0053174 A1 | 3/2006 | Gardner et al. | |
| 2006/0101197 A1* | 5/2006 | Georgis | G11B 15/689 |
| | | | 711/111 |
| 2006/0253423 A1 | 11/2006 | McLane et al. | |
| 2007/0128899 A1* | 6/2007 | Mayer | G06F 9/4406 |
| | | | 439/152 |
| 2007/0209080 A1 | 9/2007 | Ture et al. | |
| 2007/0214164 A1 | 9/2007 | MacLennan et al. | |
| 2007/0288247 A1 | 12/2007 | Mackay | |
| 2008/0022347 A1 | 1/2008 | Cohen | |
| 2008/0104542 A1 | 5/2008 | Cohen et al. | |
| 2008/0177994 A1 | 7/2008 | Mayer | |
| 2008/0229037 A1* | 9/2008 | Bunte | G06F 21/6218 |
| | | | 711/E12.103 |
| 2008/0281915 A1 | 11/2008 | Elad et al. | |
| 2008/0301123 A1* | 12/2008 | Schneider | G06F 16/2471 |
| | | | 707/999.005 |
| 2008/0301124 A1 | 12/2008 | Alves et al. | |
| 2008/0301125 A1 | 12/2008 | Alves et al. | |
| 2008/0301135 A1 | 12/2008 | Alves et al. | |
| 2008/0319943 A1 | 12/2008 | Fischer | |
| 2009/0070786 A1 | 3/2009 | Alves et al. | |
| 2009/0300065 A1 | 12/2009 | Birchall | |
| 2009/0307287 A1* | 12/2009 | Barsness | G06F 16/24561 |
| 2009/0319512 A1 | 12/2009 | Baker et al. | |
| 2009/0319672 A1 | 12/2009 | Reisman | |
| 2010/0100562 A1 | 4/2010 | Millsap | |
| 2010/0333162 A1* | 12/2010 | Lloyd | G06F 16/951 |
| | | | 707/769 |
| 2011/0066585 A1 | 3/2011 | Subrahmanyam et al. | |
| 2011/0093471 A1 | 4/2011 | Brockway et al. | |
| 2011/0191373 A1 | 8/2011 | Botros et al. | |
| 2011/0209049 A1 | 8/2011 | Ghosh et al. | |
| 2011/0225143 A1 | 9/2011 | Khosravy et al. | |
| 2011/0252016 A1 | 10/2011 | Shacham et al. | |
| 2011/0289422 A1 | 11/2011 | Spivack et al. | |
| 2012/0030180 A1* | 2/2012 | Klevenz | G06F 16/245 |
| | | | 707/661 |
| 2012/0059823 A1 | 3/2012 | Barber et al. | |
| 2012/0079363 A1 | 3/2012 | Folting et al. | |
| 2012/0110004 A1 | 5/2012 | Meijer | |
| 2012/0191716 A1 | 7/2012 | Omoigui | |
| 2013/0022116 A1 | 1/2013 | Bennett | |
| 2013/0054642 A1 | 2/2013 | Morin | |
| 2013/0124495 A1 | 5/2013 | Sejnoha et al. | |
| 2013/0219068 A1 | 8/2013 | Ballani et al. | |
| 2013/0239163 A1 | 9/2013 | Kim et al. | |
| 2013/0275452 A1 | 10/2013 | Krishnamurthy et al. | |
| 2013/0292165 A1 | 11/2013 | Lin | |
| 2013/0311427 A1 | 11/2013 | Patel et al. | |
| 2013/0311438 A1 | 11/2013 | Marquardt et al. | |
| 2013/0318236 A1 | 11/2013 | Coates et al. | |
| 2014/0019405 A1 | 1/2014 | Borthakur et al. | |
| 2014/0025427 A1 | 1/2014 | Bastian et al. | |
| 2014/0059552 A1 | 2/2014 | Cunningham et al. | |
| 2014/0101178 A1 | 4/2014 | Ginter | |
| 2014/0115282 A1 | 4/2014 | Natkovich et al. | |
| 2014/0137104 A1* | 5/2014 | Nelson | G06F 9/45558 |
| | | | 718/1 |
| 2014/0160238 A1 | 6/2014 | Yim et al. | |
| 2014/0188931 A1 | 7/2014 | Smiling et al. | |
| 2014/0222758 A1* | 8/2014 | March | G06F 16/1873 |
| | | | 707/638 |
| 2014/0236889 A1 | 8/2014 | Vasan et al. | |
| 2014/0280032 A1 | 9/2014 | Kornacker et al. | |
| 2014/0324862 A1 | 10/2014 | Bingham et al. | |
| 2015/0278153 A1 | 10/2015 | Leonard et al. | |
| 2016/0055225 A1 | 2/2016 | Xu et al. | |
| 2017/0139996 A1 | 5/2017 | Marquardt et al. | |
| 2018/0285418 A1 | 10/2018 | Petropoulos et al. | |
| 2019/0098106 A1 | 3/2019 | Mungel et al. | |
| 2019/0317947 A1 | 10/2019 | Xu et al. | |

OTHER PUBLICATIONS

Carasso, D., "Exploring Splunk Search Processing Language (SPL) Primer and Cookbook", CITO Research, pp. 1-156 (2012).

"Incident Review dashboard," User Manual, Splunk® App for PCI Compliance, Version 2.1.1, accessed at http://docs.splunk.com/Documentation/PCI/2.1.1/User/IncidentReviewdashboard, accessed on Sep. 9, 2019, p. 2.

Elghandour, I., and Aboulnaga, A., "ReStore: Reusing Results of MapReduce Jobs," Proceedings of the VLDB Endowment, vol. 5, No. 6, pp. 586-597 (2012).

"VSphere Monitoring and Performance," Update 1, vSphere 5.5, EN-001357-00, accessed at https://web.archive.org/web/20140913043828/http://pubs.vmware.com/vsphere-55/topic/com.vmware.ICbase/PDF/vsphere-esxi-vcenter-server-551-monitoring-performance-guide.pdf, accessed on Sep. 9, 2019, p. 174.

"Splunk Cloud 8.0.2004 User Manual", available online, retrieved on May 20, 2020 from docs.splunk.com, p. 66.

"Splunk Enterprise 8.0.0 Overview", available online, retrieved on May 20, 2020 from docs.splunk.com, p. 17.

"Splunk Quick Reference Guide", updated 2019, available online at https://www.splunk.com/pdfs/solution-guides/splunk-quick-reference-guide.pdf, retrieved on May 20, 2020, p. 6.

SQL/MED retrieved from http://wiki.postgresql.org/wiki/SQL/MED, accessed on Sep. 11, 2013, p. 10.

* cited by examiner

Original Search: 501
search "error | stats count BY host

Sent to peers: 502
search "error | prestats count BY host (map)

Executed by search head: 503
Merge prestats results received from peers (reduce)

Data Summary                                                                                           ×

Hosts (5)    Sources (8)    Sourcetypes (3)

( filter )

| Host ◇ | ıl | Count ◇ | Last Update ◇ |
|---|---|---|---|
| mailsv | ıl ⌄ | 9,829 | 4/29/14 1:32:47.000 PM |
| vendor_sales | ıl ⌄ | 30,244 | 4/29/14 1:32:46.000 PM |
| www1 | ıl ⌄ | 24,221 | 4/29/14 1:32:44.000 PM |
| www2 | ıl ⌄ | 22,595 | 4/29/14 1:32:47.000 PM |
| www3 | ıl ⌄ | 22,975 | 4/29/14 1:32:45.000 PM |

FIG. 6B

MAINTAINING ARCHIVE AND CUT-OFF DATES FOR QUERYING A DATA STORE

CROSS-REFERENCE TO RELATED APPLICATIONS

This application is a continuation of U.S. application Ser. No. 17/080,067, filed Oct. 26, 2020, entitled "Querying an Archive for a Data Store;" which is a continuation of U.S. application Ser. No. 15/885,521, filed Jan. 31, 2018, entitled "Employing External Data Stores to Service Data Requests," issued as U.S. Pat. No. 10,860,596; which is a continuation of U.S. application Ser. No. 14/815,734, filed Jul. 31, 2015, entitled "Processing System Search Requests From Multiple Data Stores with Overlapping Data," issued as U.S. Pat. No. 9,916,367; which is a continuation-in-part of U.S. application Ser. No. 14/449,144, filed Jul. 31, 2014, entitled "Processing a System Search Request Including External Data Sources," issued as U.S. Pat. No. 9,514,189; which is a continuation of U.S. application Ser. No. 14/266,832, filed May 1, 2014, entitled "Processing a System Search Request across Disparate Data Collection Systems," issued as U.S. Pat. No. 10,049,160; which is a continuation of U.S. application Ser. No. 13/886,737, filed on May 3, 2013, entitled "External Result Provided Process for Retrieving Data Stored using a Different Configuration or Protocol," issued as U.S. Pat. No. 8,738,629. The entire contents of each of the foregoing applications are incorporated by reference herein.

BACKGROUND

Search support systems generally provide an interface to users for submitting search requests to a database according to a file system maintained by the search support system. The database and file system of the search support system can be transparent to the user. Such search requests are efficiently processed over the database, according to the file system, and can be carried out in real time. For searches that cover multiple databases of different search support systems, a user would generally need to login to each different search support system and submit a search request in accordance with the format of each of the different search support systems.

SUMMARY

Embodiments of the present invention are directed to enabling searching of a data store and archive. In accordance with aspects of the present disclosure, a search support system may receive a search request. In response to receiving the search request, the search support system may identify a first data store and a second data store from which to satisfy the search request. The second data store containing archived data from the first data store. Once archived to the second data store, data from the first data store remains available in the first data store for a limited period of time, such that an intersection of the first data store and the second data store is a proper subset of both the first data store and the second data store. The first data store may store data in a first format and the second data store may store data in a second format, the first format and the second format being different from one another. The search support system may then determine that a subset of data that has been archived into the second data store and is to be searched as part of the search request is still available from the first data store. In response to determining that the subset of data is still available from the first data store, the search support system may execute the search request on the subset of data utilizing the first data store.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates an exemplary search query received from a client and executed by search peers in accordance with the disclosed embodiments.

FIG. 6A illustrates a search screen in accordance with the disclosed embodiments.

FIG. 6B illustrates a data summary dialog that enables a user to select various data sources in accordance with the disclosed embodiments.

DETAILED DESCRIPTION

Figure 1:
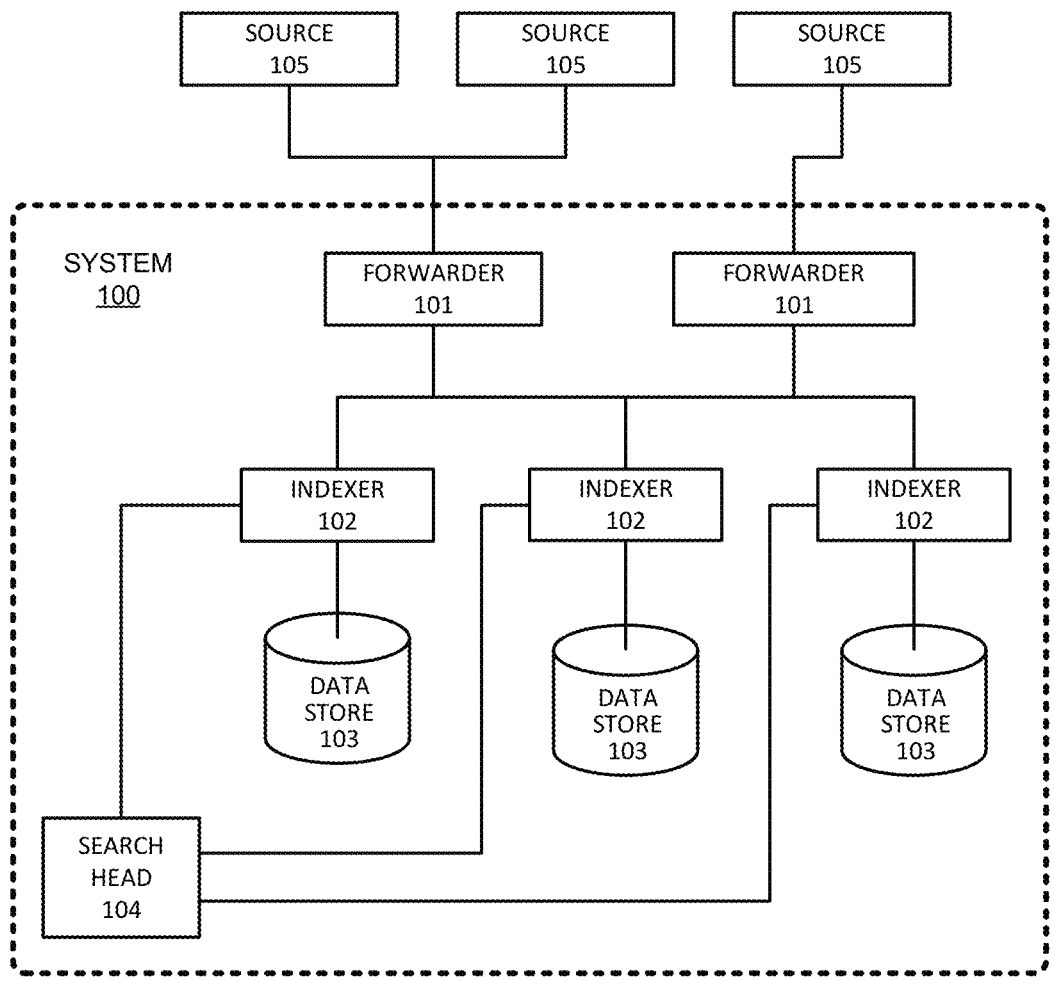
FIG. 1 presents a block diagram of an event-processing system in accordance with the disclosed embodiments.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without these specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase may refer to the same embodiment or another embodiment. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C), or (A, B and C)."

1.1 Overview

Modern data centers often comprise thousands of host computer systems that operate collectively to service requests for data from an even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it. It will be appreciated that, while performance data is specifically mentioned above, this disclosure is not limited to such embodiments and can be applied to any type of data.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data, despite the above discussed benefits, can pose additional challenges because of the difficulty of applying semantic meaning to unstructured data, and the difficulty of indexing and querying, or searching, unstructured data using traditional database systems.

These challenges can be addressed by using an event-based search support system, such as the SPLUNK® ENTERPRISE system produced by Splunk Inc. of San Francisco, California, to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system can be particularly useful for analyzing unstructured performance data, which is commonly found in system log files, for example. Although many of the techniques described herein are explained with reference to the SPLUNK® ENTERPRISE system, the techniques are also applicable to other types of search support systems such as, for example, Hadoop, Cassandra, and MongoDB.

In the SPLUNK® ENTERPRISE system, performance data is stored in data stores as "events," wherein each event comprises a collection of performance data and/or diagnostic information that is generated by a computer system and is correlated with a specific point in time. In embodiments, this collection of performance data and/or diagnostic data can be raw data. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements, or other time-series data, such as, for example, data obtained from weblogs, syslogs, or sensor readings. It divides this raw data into "portions," and optionally transforms the data to produce timestamped events. The system stores the timestamped events in a data store, such as those discussed in detail below, and enables a user to run queries, or search requests, against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data of the events to extract values for specific fields of the events. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query, or search request, is actually executed. This means that extraction rules for the fields in a search request may be provided in the search request itself, or may be located during execution of the search request. Hence, as an analyst learns more about the data in the events, the analyst can continue to refine the late-binding schema by adding new fields, deleting fields, or changing the field extraction rules until the next time the schema is used by a search request. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
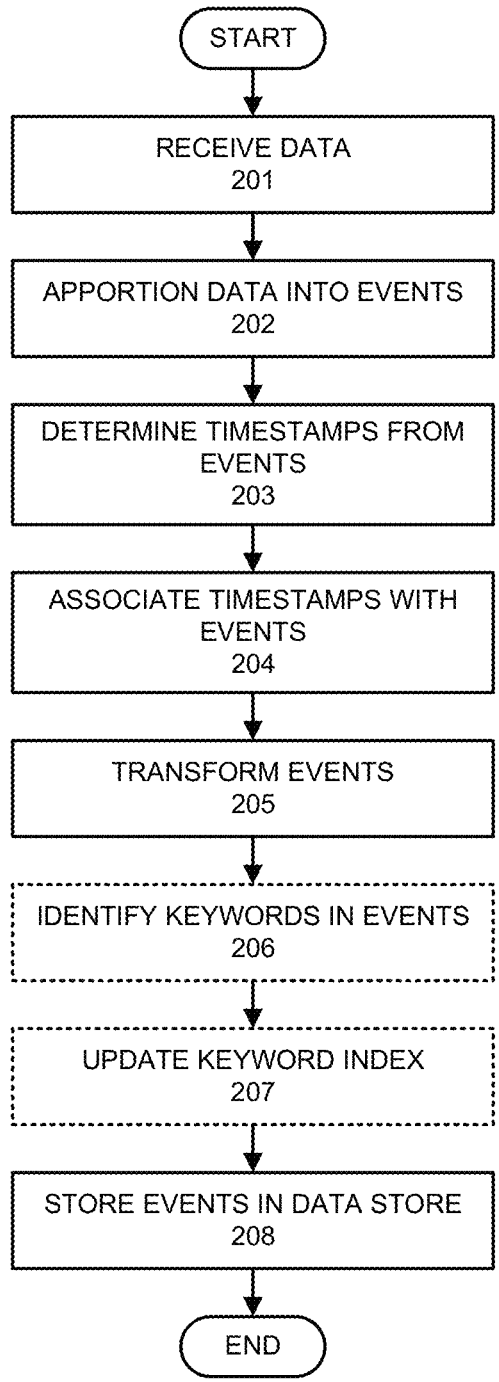
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
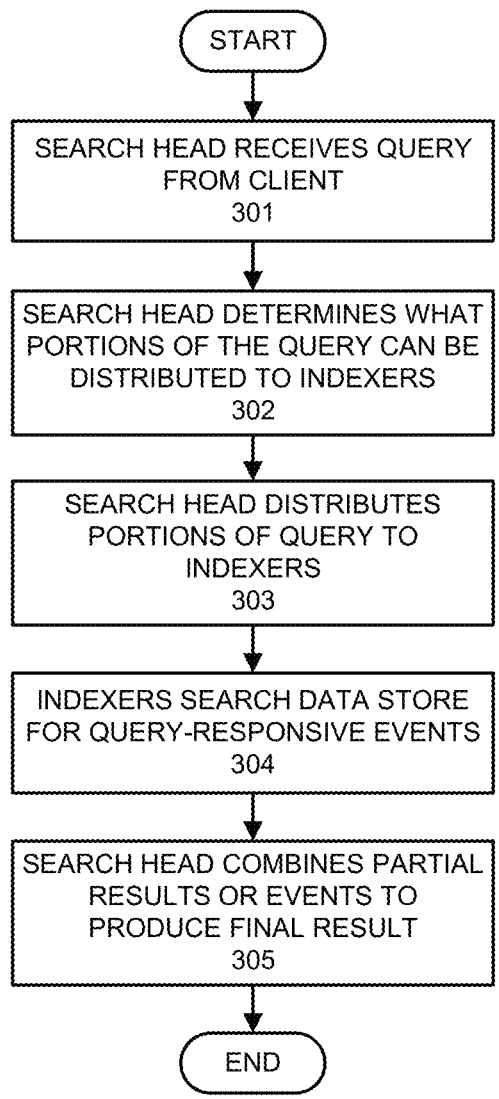
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
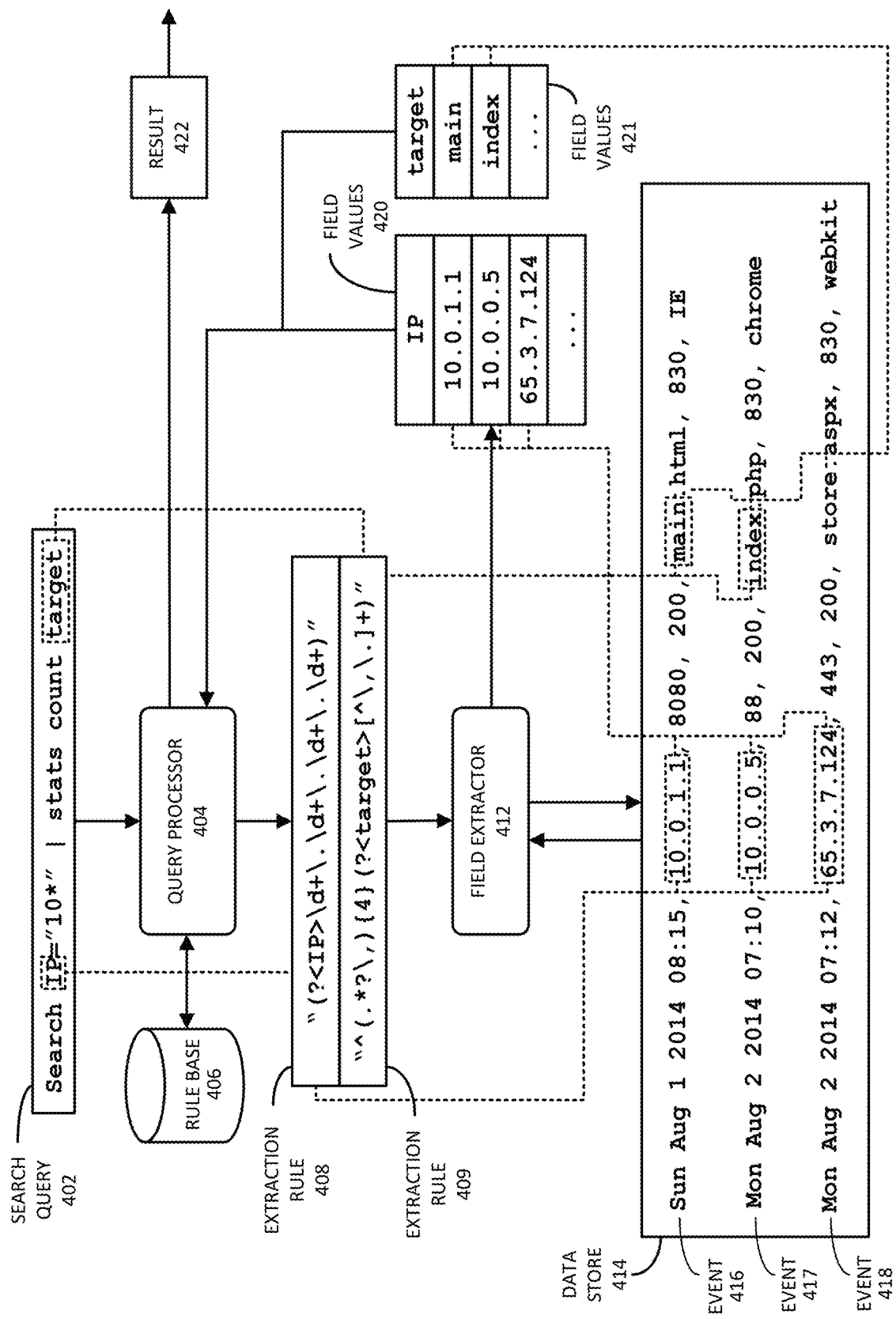
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP= "10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
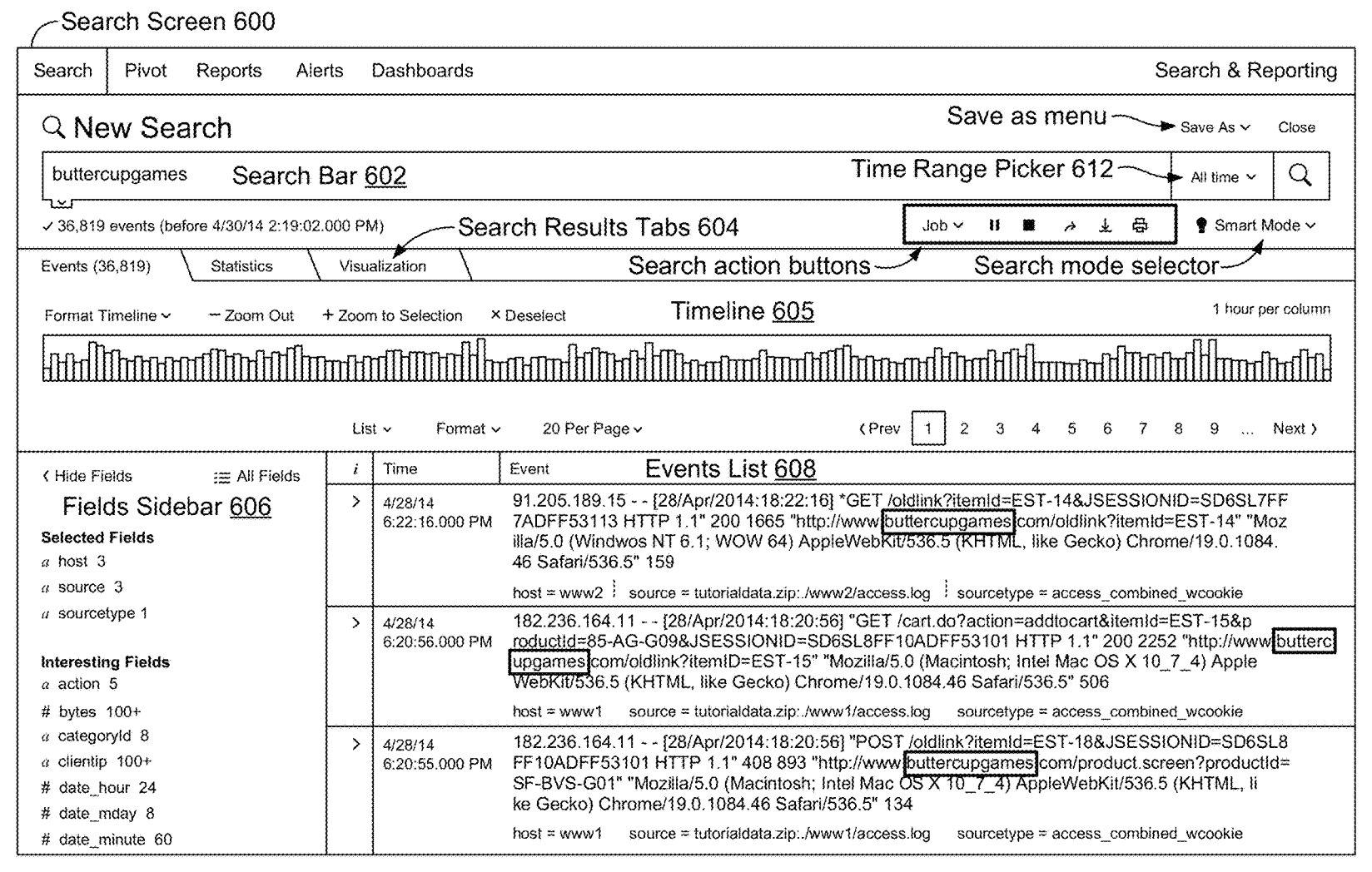

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
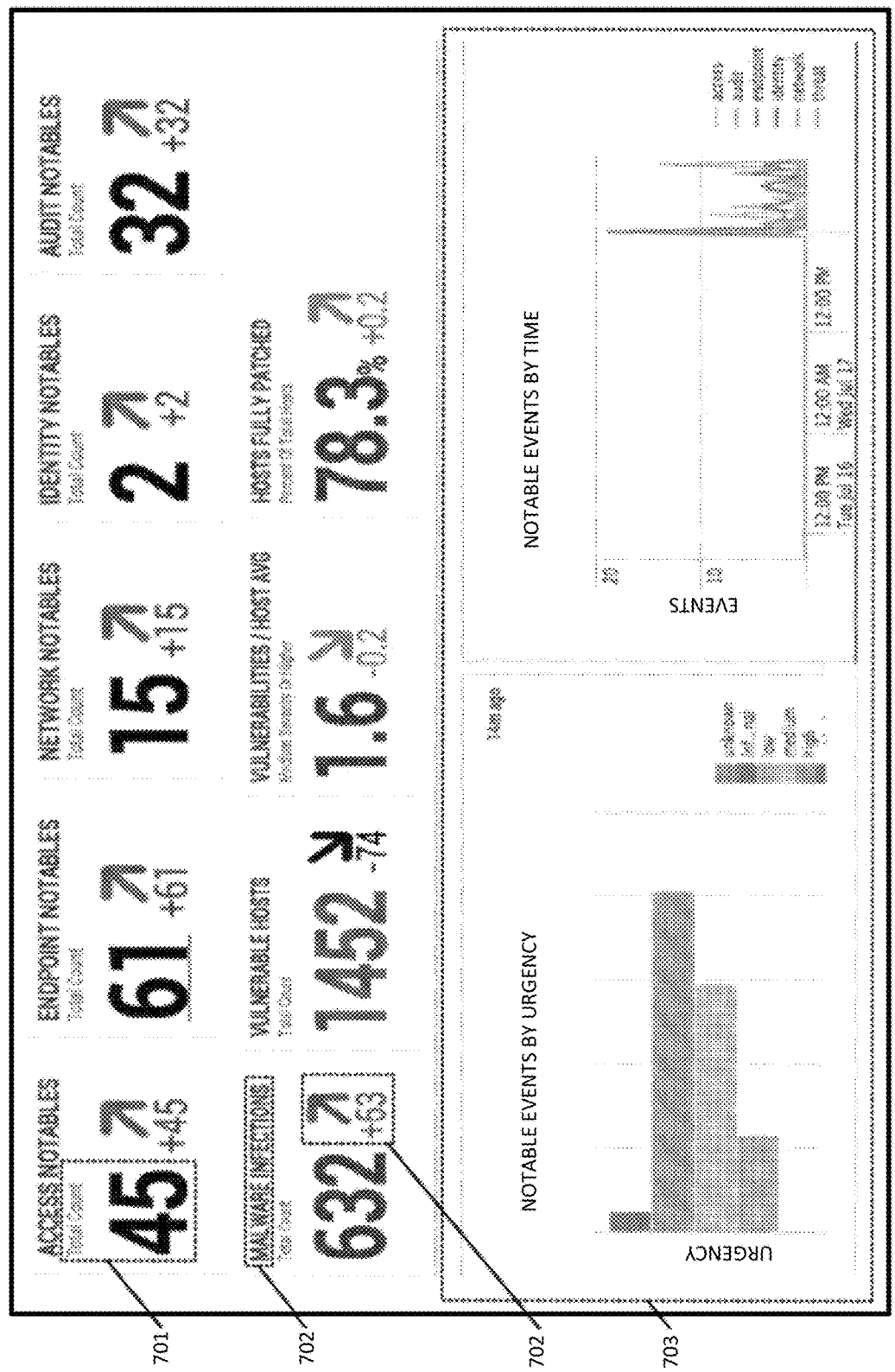
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
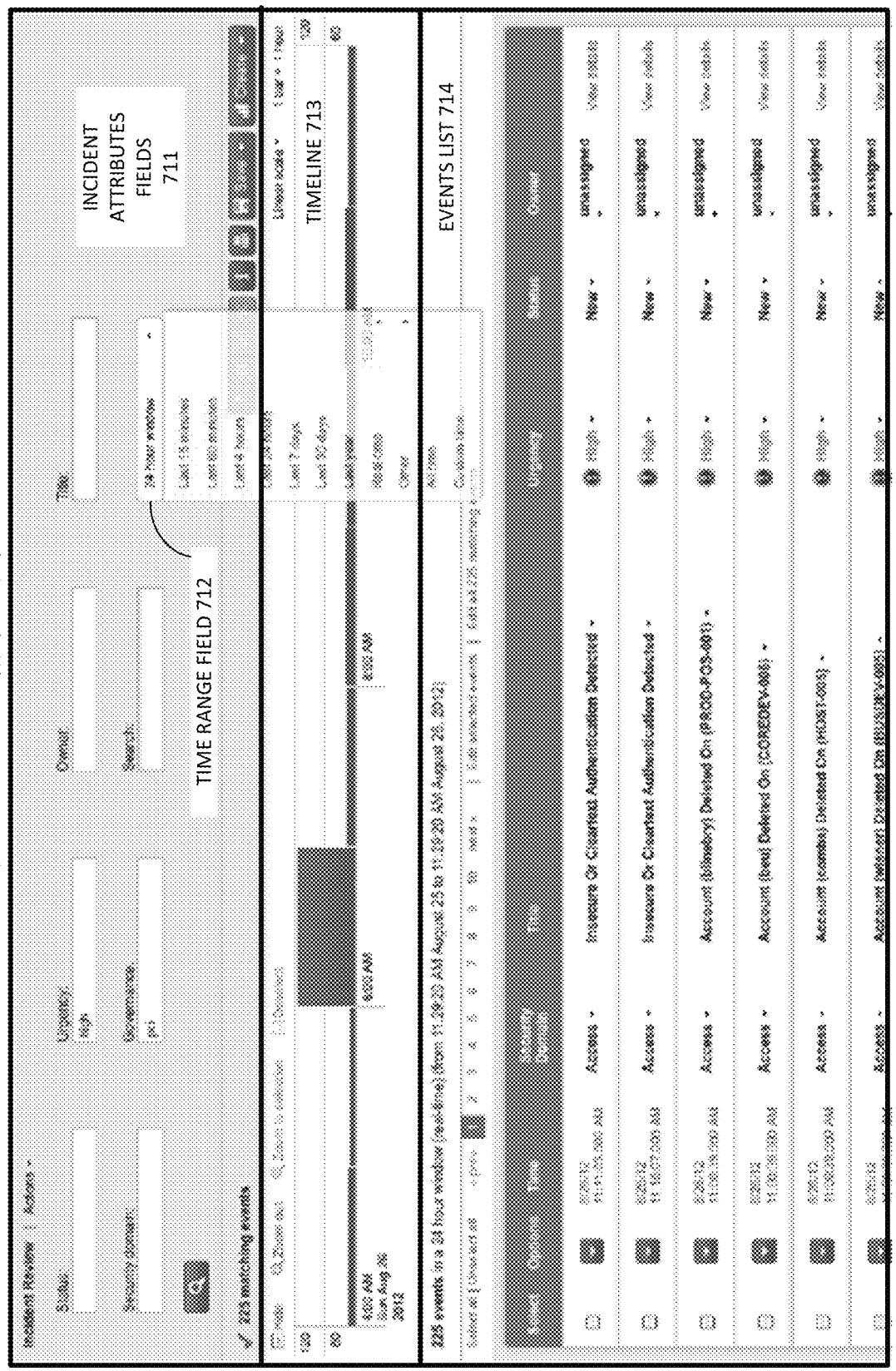
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
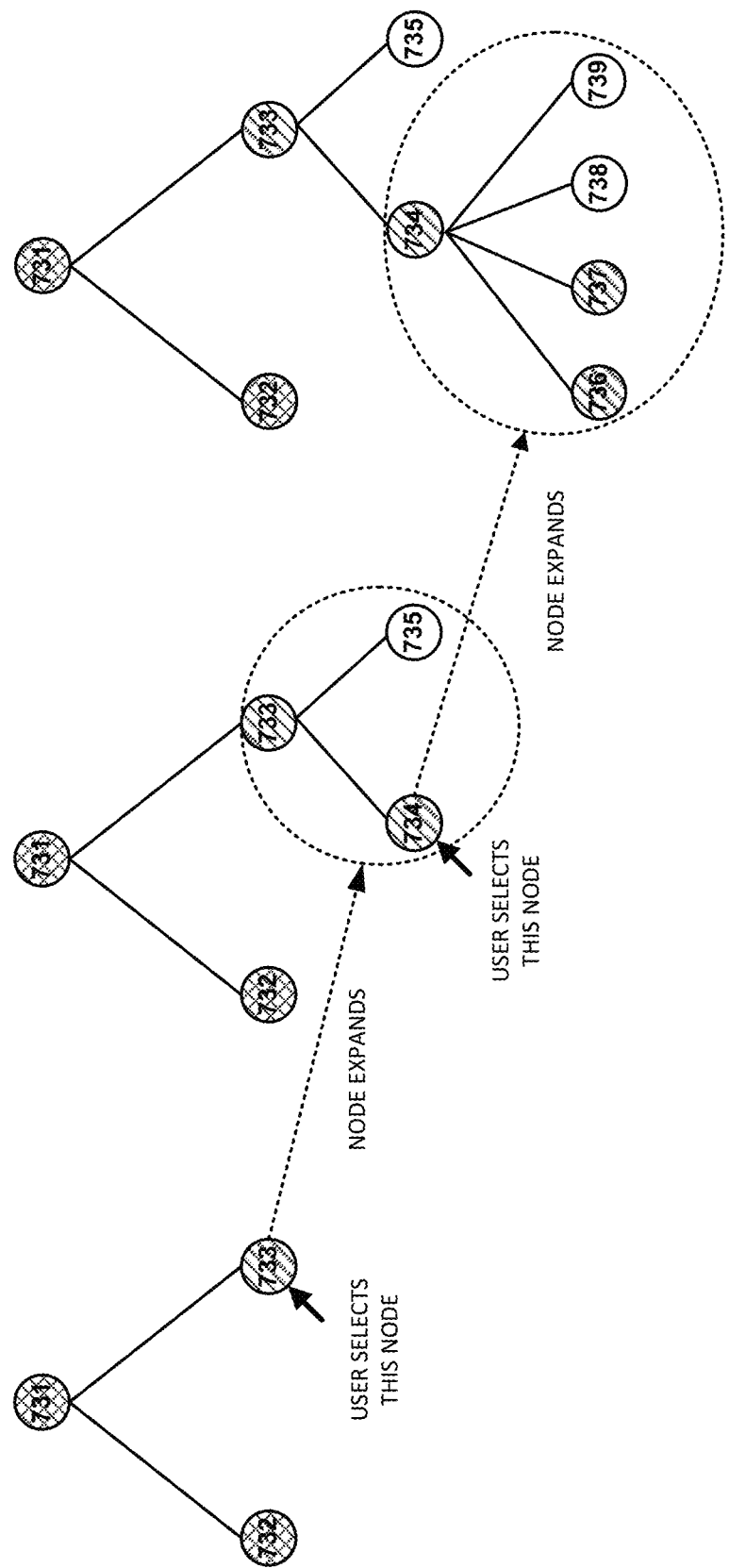
FIG. 7C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
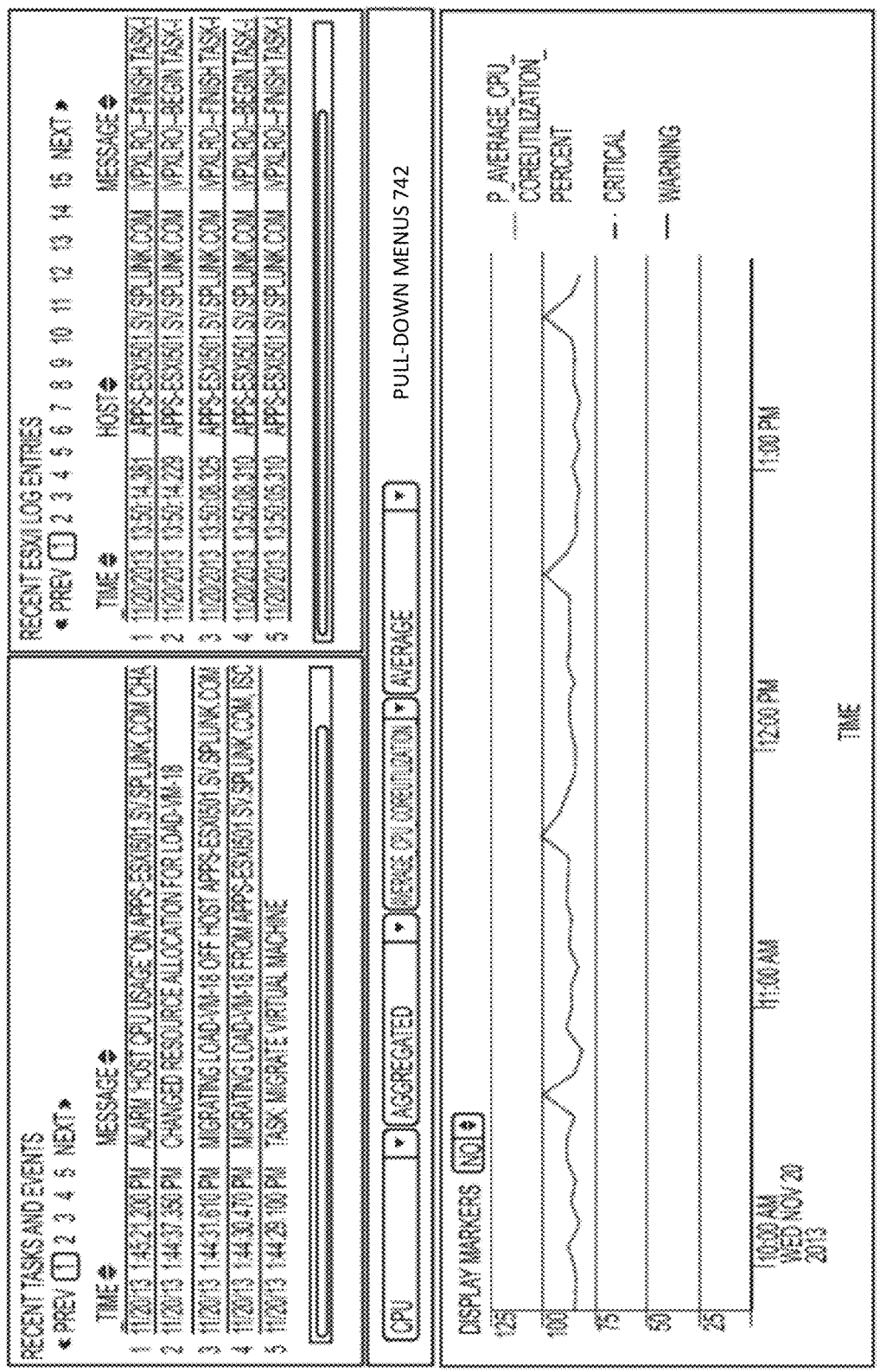
FIG. 7D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.1 Illustrative Search Support System

Figure 8:
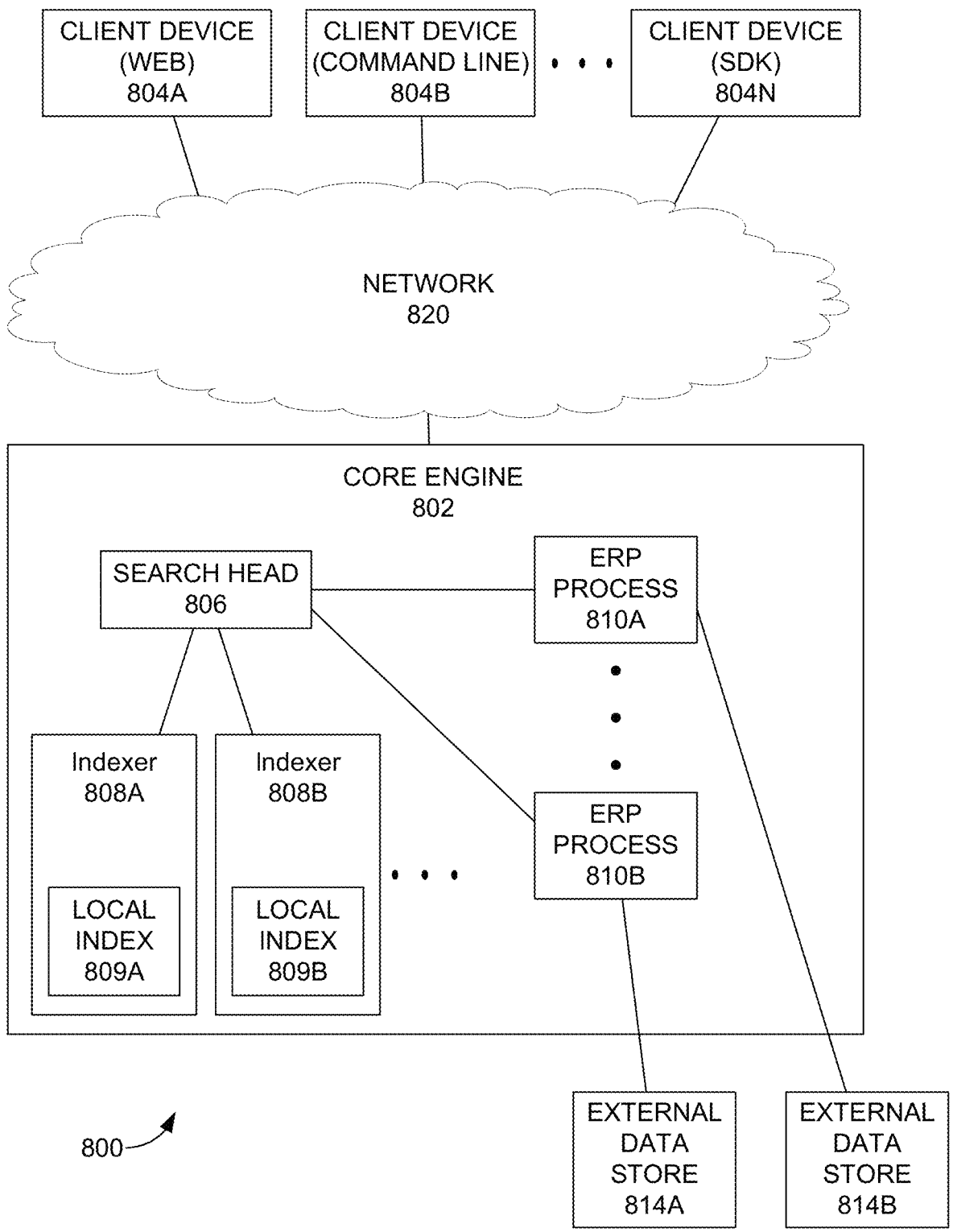
FIG. 8 depicts a block diagram of an illustrative search support system in accordance with various embodiments of the present disclosure.

FIG. 8 depicts a block diagram of an illustrative search support system 800 in accordance with various embodiments of the present disclosure. As used herein, search support system may refer to any system that provides for, or enables, the management, storage, and retrieval of data to satisfy search requests.

In embodiments, search support system 800 can include a core engine 802. Core engine 802 may be communicatively coupled with one or more client devices (e.g., client devices 804A-804N, hereinafter collectively referred to simply as client devices 804) via network 820. Network 820 can be any conventional network and can include any combination of wired and or wireless networks, such as, for example, the Internet. In addition, communications transmitted between these one or more client devices and core engine 802 may be accomplished utilizing any conventional communication protocol, such as, for example, Hypertext Terminal Protocol (HTTP).

As depicted, core engine 802 may include a search head 806 that can be configured to process search requests received by core engine 802. In addition, core engine 802 may include one or more indexers 808A-808B, which may each be configured to respectively manage a local, or native, data store of the search support system 800. Examples of such local data stores are represented here as local indexes 809A-809B. In some embodiments, core engine 802 may also include one or more external results providers (ERP) 810A-810B which may be configured to interface with one or more external data stores 814A-814B. These external data stores may include portions of data that have been archived from the local data stores mentioned above and may be coupled with the core engine 802 via any conventional network. It will be appreciated that the composition of the core engine 802 is merely meant to be illustrative and should not be viewed as limiting of this disclosure. Any combination of components capable of carrying out aspects of the invention described herein is expressly contemplated as being within the scope of this disclosure.

As used herein, a data store that is said to be native, or local, to the search support system 800 is a data store that is configured to store data in a format and manner so as to be directly accessible by the search support system 800. In some embodiments such a format and manner may be proprietary to the search support system 800. For example, a native data store of the previously discussed SPLUNK® ENTERPRISE system may be configured to store data in the form of events. Examples of such native data stores are depicted by local indexes 809A-809B, collectively referred to hereinafter as local indexes 809.

Indexers 808A-808B, collectively referred to hereinafter simply as indexers 808, can be configured to respectively manage local indexes 809A-809B. To manage local indexes 809, the indexers 808 may be configured to, for example, search the local indexes 809 for events that satisfy a search request received from one of the client devices 804.

In some embodiments, the indexers 808 may also be configured to archive, or cause to be archived, data from the local indexes 809 to respective ones of external data stores 814A-814B, collectively referred to hereinafter simply as external data stores 814. For example, local indexer 808A may archive, or cause to be archived, data from local index 809A to external data store 814A while local indexer 808B may archive, or cause to be archived, data from local index 809B to external data store 814B. In other embodiments, search head 806 can be configured to accomplish, or initiate, such archiving, rather than one of the indexers. This archiving may enable a user of the search support system 800 to have at least a portion of data copied from the local indexes 809 of the search support system 800, which may be higher cost or of limited capacity, to a designated external data store, which may be lower cost or provide additional capacity, in order to permanently, or semi-permanently, persist the portion of data outside the search support system 800. In embodiments, the portion of data may be deleted from the local indexes after the portion of data is archived from the local indexes 809 to the external data store, such deletion is discussed in greater detail below. In some embodiments, however, the portion of data may be persisted on the local indexes 809 for a period of time prior to being deleted from the local indexes 809. As such, there can be a period of time in which the portion of data is available in both the local indexes 809 and the external data stores 814 after the portion of data has been archived to the external data stores 814, but before the portion of data has been deleted from the local indexes 809. Put another way, an intersection of the set of data contained within the local indexes 809 and the set of data contained within the external data stores 814 would be a proper subset of both the local indexes 809 and the external data stores 814. As used herein, a proper subset of a set refers to a subset that is not equal to the set.

In addition, the indexers 808 can be configured to detect the occurrence of a deletion event with respect to data within the local indexes 809 and delete at least a portion of the data contained within the local indexes 809 in response to detection of a deletion event. As used herein, a deletion event can be any event that is to cause deletion of data from a local index. Such deletion events may include, for example, the amount of data within the local indexes 809 exceeding a predefined maximum threshold, the amount of available space remaining in the local indexes 809 being below a minimum threshold, a delete date associated with data stored within the local indexes (e.g., data expiration), a delete date associated with the respective indexer, etc. In some embodiments, the indexer, or another component of the search support system may prevent deletion of any portion of data without that portion of data having been archived to an external data store 814. In such embodiments, upon detecting a deletion event for a portion of data, the search support system may determine if the portion of data has been archived, and, if not, cause the portion of data to be archived prior to allowing deletion of the portion of data.

External data stores 814, may be coupled with the core engine 802 via any conventional network, including any combination of wired and/or wireless networks. As such, external data stores 814 may be considered remote from the search support system 800. As used herein, a data store being referred to as remote from the search support system 800 can indicate that the data store does not reside on a same local area network as the search support system or that the search support system is coupled to the external data store via, for example, a wide area network or the Internet. While the local data stores can be configured to store data in a format and manner so as to be directly accessible by the search support system 800, external data stores 814 may store data in a different format or manner that can be specific to the external data stores 814. For example, external data stores 814 may store data in a Hadoop Distributed File System (HDFS), a Cassandra File System (CFS), a MongoDB Grid File System (GridFS), or any other data format.

In embodiments, core engine 802 can be configured to receive search requests from the one or more client devices 804 via network 820. Search head 806 can be configured to process these search requests. In processing these search requests, search head 806 may be configured to determine what portions of the search request can submitted to indexers 808 and what portions need to be executed on external data stores 814. To accomplish this, search head 806 can be configured to identify that the search request is associated with both a local data store (e.g., local index 809A or 809B), and an external data store (e.g., external data store 814A or 814B). This may be accomplished via any number of mechanisms. For example, in some embodiments, this may be accomplished by search head 806 first identifying a local data store associated with the search request and then identifying an external data store that is being utilized as an archive for the local data store. In such embodiments, the external data store may be identified via a data structure (e.g., lookup table) maintained by the search head that may cross-reference local data stores with respective external data stores that are being utilized for archiving purposes. In other embodiments, the search head may first identify a local data store associated with the search request and then query the indexer that manages that local data store to determine if an external data store has been designated as an archive of the identified local data store. Such a designation may be made, for example, by a user of the search support system. It will be appreciated that these examples are merely meant to be illustrative and that any suitable mechanism that correlates a local data store with an external data store that is being utilized as an archive of the local data store is within the scope of this disclosure. In embodiments, the external data store may store data in a format that is in accordance with, for example, a Hadoop Distributed File System (HDFS), a Cassandra File System (CFS), or a MongoDB Grid File System (GridFS). The local date store on the other hand may store data in a format that is in accordance with, for example, SPLUNK® ENTERPRISE discussed above.

As discussed above, in some embodiments, a subset of data that has been archived to an external data store may be persisted on the local data store for a period of time prior to being deleted from the local data store. As such, there can be a period of time in which the subset of data is still available in the local data store even though the subset of data has been archived to the external data store. Such a period of time may be selected to provide for sufficient time to ensure that the subset of data has been fully archived. In some embodiments, the time period may be selected to provide for time to archive the data prior to the local data store reaching capacity, as such, the time could be based on a rate at which data is being received by the data store. In other embodiments, once archived the subset of data may remain in the local data store until space is needed in the local data store at which point the subset of data may be deleted. This period of time would coincide with the period of time between when the subset of data has been archived to the external data store and when the portion of data has been deleted, or otherwise made unavailable (e.g., via a cut-off date), from the local data store. As such, an intersection of the set of data contained within the local data store and the set of data contained within the external data store would be a proper subset of both the local data store and the external data store. This data timeline is discussed in greater detail in reference to FIG. 10, below.

In embodiments, search head 806 may be configured to determine whether this subset of data is still available from the local data store. This may be accomplished in any number of ways by the search head. As such a series of example embodiments are presented below to try and illustrate a selection of ways in which the search head may determine this subset of data. It will be appreciated that these examples are selected for purposes of illustration only and should not be interpreted as limiting of this disclosure.

As first examples, to determine that the subset of data is still available includes the search head determining whether the subset of data is older than a delete date. This delete date may be associated with the local data store. Such an association may be accomplished locally via the indexer that manages the local data store or globally via the search head of the search support system. In some embodiments, this delete date may be defined by a user of the search support system. Such a user may be, for example, the owner of the data contained within the local data store. In other embodiments, this delete date may be defined by a deletion process of the search support system. For example, the deletion process may determine a delete date based on an amount of data contained within the local data store, or the search support system as a whole, exceeding a deletion threshold. In such an example, the deletion process may calculate the delete date to bring the amount of data to a point below the deletion threshold. As another example the deletion process may determine a deletion date based on an amount of available space within the local data store, or the search support system as a whole, dropping below a deletion threshold. In such an example, the deletion process may calculate the deletion date to bring the amount of space available to a point above the deletion threshold. Such a deletion process may be carried out, for example, by the search head or an indexer associated with local data store. As yet another example, the delete date may be updated for a local data store by the search head or the indexer of the local data store as data is deleted from the local data store. In such examples, the delete date may represent the oldest date for any data that is still available in the local data store. In other embodiments, the deletion date may be based on an archive date, such as that discussed below (e.g., deletion date is a set time period from the archive date). In still other embodiments, whether a subset of data is still available includes monitoring the subset of data to detect a deletion event, such as the deletion events described above in reference to FIG. 8. In response to detecting the deletion event updating a table of the search support system to reflect that the subset of data is being deleted and is no longer available. Once the table is updated, the indexer of a local data store on which the subset of data resides may delete the subset of data from the local data store.

As second examples, to determine that the subset of data is still available includes the search head determining whether the subset of data is older than a cut-off date. In some embodiments, the cut-off date may be a date prior to which the search system guarantees that data that has yet to exceed the cut-off date is still available in the local data store. Put another way, the cut-off date may be indicative of a date beyond which data will be deleted as necessary from the search support system. In contrast, data that has exceeded the cut-off date is not guaranteed to still be available and therefore the external data store would be utilized to satisfy the search request to ensure that as much data as possible is returned by the search request. In embodiments, this cut-off date may be a local cut-off date associated with the local data store, or an indexer of the local data store. In other embodiments, this cut-off date may be a global cut-off date associated with the search head or the search support system as a whole and may be applied uniformly across the indexers of the search support system. In some embodiments, this cut-off date may be defined by a user of the search support system. Such a user may be, for example, the owner of the data contained within the local data store. In other embodiments, this cut-off date may be defined by a cut-off process of the search support system. For example, in embodiments where the cut-off date is global, the search head or the individual indexers may monitor indexes of the search support system to detect a deletion event associated with one of those indexes. In response to detecting a deletion event with respect to a portion of data from one of those indexes, the respective indexer of the one index or the search head may update the global cut-off date of the search support system to reflect a date that precedes an earliest date associated with the portion of data being deleted. In such an embodiment, the cut-off date would merely indicate that at least some data within the search support system that is older than the cut-off date has been deleted. As such, the search support system may not be able to guarantee that the subset of data is still available if the subset of data is older than the cut-off date. Such a cut-off process may be carried out, for example, by the search head or an indexer associated with local data store.

As third examples, the search head may initially determine that the subset of data has been archived based on whether the subset of data is older than an archive date. This archive date may be associated with the local data store. Such an association may be accomplished locally via the indexer that manages the local data store or globally via the search head of the search support system. In some embodiments, this archive date may be defined by a user of the search support system. Such a user may be, for example, the owner of the data contained within the local data store. In other embodiments, this archive date may be defined by an archiving process of the search support system. For example, the archiving process may determine an archive date based on an amount of data contained within the local data store, or the search support system as a whole, exceeding an archive threshold. In such an example, the archiving process may calculate the archive date to bring the amount of data to a point below the archive threshold. As another example the archiving process may determine an archive date based on an amount of available space within the local data store, or the search support system as a whole, dropping below an archive threshold. In such an example, the archiving process may calculate the archive date to bring the amount of space available to a point above the archive threshold. Such an archiving process may be carried out, for example, by the search head or an indexer associated with local data store. This archive date may be utilized in determining the deletion date or the cut-off date discussed above, as such the archive date may be utilized in determining availability of the data.

As fourth examples, the search head may query the indexer of the subset of data to determine if the subset of data still exists in the local index of the indexer.

Once it is determined that the subset of data is available in the local data store, the search request may be executed on the subset of data utilizing the local data store. Such a process may be performed by one or more indexers of the search support system that are associated with the subset of data. In such embodiments the search head may initiate each indexer of the one or more indexers to execute the search request. It will be appreciated that the local data store may be the preferred location in which to search the subset of data because a local data store generally provides for quicker results than an external data store and may also provide additional functionality that would not be available from the external data store.

In embodiments, the subset of data comprises event data that includes a plurality of events. Each event may include a timestamp associated with raw data, such as that discussed previously. In such embodiments, executing the search request on the subset of data may include applying extraction rules that specify how to extract values from the plurality of events. In embodiments, these extraction rules may be defined by regular expressions. In some embodiments, executing the search request on the subset of data includes applying a late binding schema to the plurality of events. In such embodiments, the late binding schema may be associated with one or more extraction rules that are based on the search request.

In some instances, search head 806 may determine that a second subset of data to be searched as part of the search request has been archived into an external data source and is no longer available in the local data store. In such instances, search head 806 may be configured to initiate an external results provider (ERP) process (e.g., ERP process 810A or 810B, collectively referred to hereinafter as ERP process 810) to search the second subset of data in accordance with the search request utilizing the external data source. The ERP process 810 may be configured provide an interface between the external data store 814 and the search support system 800.

In embodiments, the ERP process 810 may generate a search request for the external data store that corresponds with that submitted by the search head to the indexer of the local data store. The ERP process 810 may then pass the search request to the external data store 814. In some embodiments, the search request is passed to the ERP process 810 as part of the request to initiate the ERP process 810. The ERP process may then provide the search head 806 with any search results from the search query that was submitted to the external data store. Search head 806 may also receive search results from indexer of the local data store. Search head 806 may then be configured to aggregate the search results from the external data store and the search results from the local data store into aggregate search results and provide these aggregate search results to the client device that submitted the search request. As such, search head 806 in combination with the ERP process enable a user to submit a single search request that is searched across both a local data store and an external data store, where the local data store and the external data store may store data in different formats.

In some embodiments, the subset of data discussed above could be considered a bucket, such as that discussed elsewhere herein. In such embodiments, the above described process could be viewed as moving the bucket from the local data store to an external data store for archival purposes and later deleting the bucket. After moving the bucket from the local data store to the external data store, the bucket, or the data therein, could be referred to as cold, because the bucket still resides in the local data store for a period of time after archiving. Once the bucket is deleted, or otherwise made unavailable (e.g., through a cut-off date), however, the bucket could be referred to as frozen because of the additional time that may be required to access and/or search the data from the external data store.

2.2 Illustrative Search Support System Operations

Figure 9:
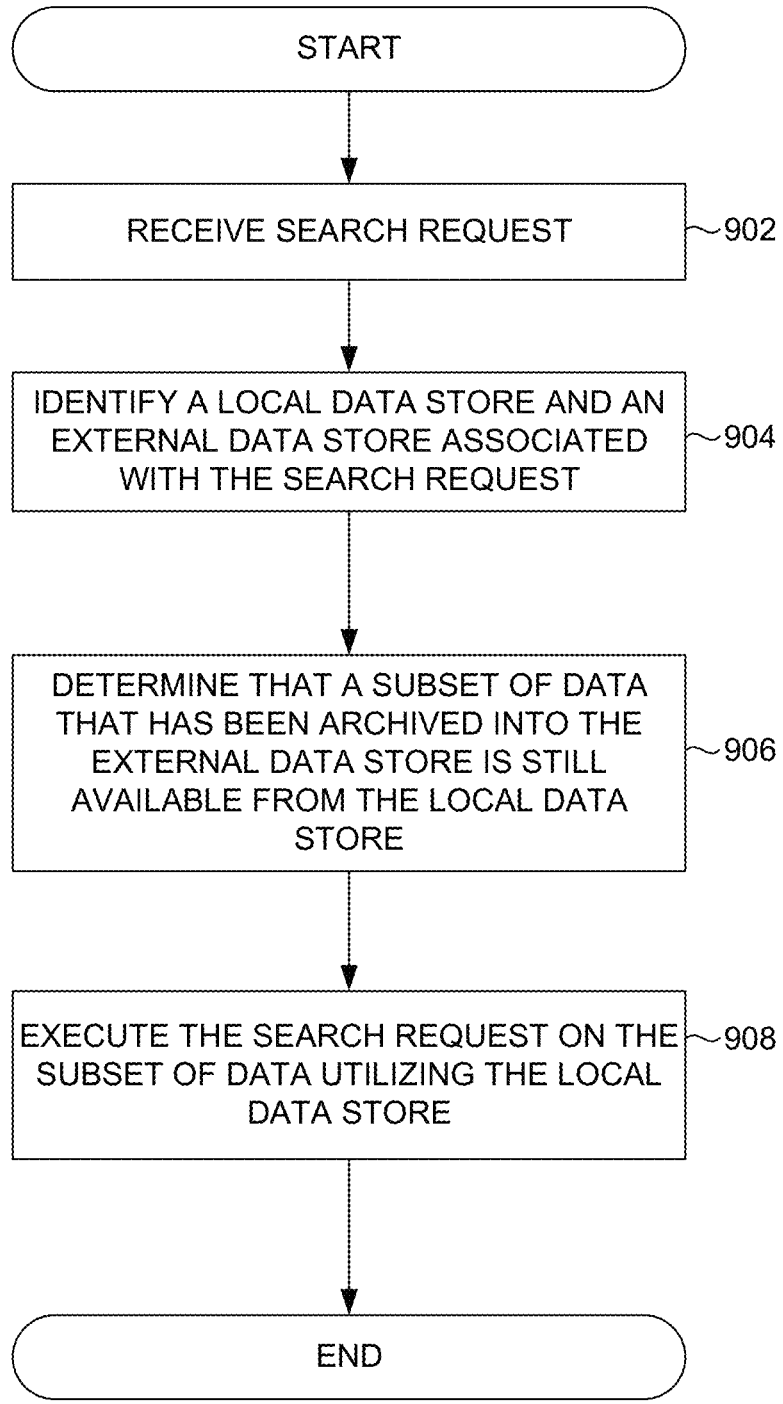
FIG. 9 is a flow diagram depicting an illustrative method of processing a search request by a search support system in accordance with various embodiments of the present disclosure.

FIG. 9 is a flow diagram depicting an illustrative method of processing a search request by a search support system (e.g., search support system 800 of FIG. 8) in accordance with various embodiments of the present disclosure. The process flow may begin at block 902 where a search head of the search support system receives a search request. Such a search request can be received from a client device, such as those described above and may be received via any conventional communication protocol (e.g., HTTP) and over any conventional network.

At block 904 the search head may identify that that search request is associated with both a local data store (e.g., local index 809A or 809B), and an external data store (e.g., external data store 814A or 814B). This may be accomplished via any number of mechanisms. For example, in some embodiments, this may be accomplished by the search head first identifying a local data store associated with the search request and then identifying an external data store that is being utilized as an archive for the local data store. In such embodiments, the external data store may be identified via a data structure (e.g., lookup table) maintained by the search head that may cross-reference local data stores with respective external data stores that are being utilized for archiving purposes. In other embodiments, the search head may first identify a local data store associated with the search request and then query the indexer that manages that local data store to determine if an external data store has been designated as an archive of the identified local data store. Such a designation may be made, for example, by a user of the search support system. It will be appreciated that these examples are merely meant to be illustrative and that any suitable mechanism that correlates a local data store with an external data store that is being utilized as an archive of the local data store is within the scope of this disclosure. In embodiments, the external data store may store data in a format that is in accordance with, for example, a Hadoop Distributed File System (HDFS), a Cassandra File System (CFS), or a MongoDB Grid File System (GridFS). The local date store on the other hand may store data in a format that is in accordance with, for example, SPLUNK® ENTERPRISE discussed above.

As discussed in reference to FIG. 8, in some embodiments, a subset of data that has been archived to an external data store may be persisted on the local data store for a period of time prior to being deleted from the local data store. As such, there can be a period of time in which the subset of data is still available in the local data store even though the subset of data has been archived to the external data store. This period of time would coincide with the period of time after the subset of data has been archived to the external data store, but before the portion of data has been deleted, or otherwise made unavailable (e.g., via a cut-off date), from the local data store. As such, an intersection of the set of data contained within the local data store and the set of data contained within the external data store would be a proper subset of both the local data store and the external data store. This data timeline is discussed in greater detail in reference to FIG. 10, below.

In embodiments, whether this subset of data is still available from the local data store may be determined by the search head at block 906. This may be accomplished in any number of ways by the search head. As such a series of example embodiments are presented below to try and illustrate a selection of ways in which the search head may determine this subset of data. It will be appreciated that these examples are selected for purposes of illustration only and should not be interpreted as limiting of this disclosure.

As first examples, to determine that the subset of data is still available includes the search head determining whether the subset of data is older than a delete date. This delete date may be associated with the local data store. Such an association may be accomplished locally via the indexer that manages the local data store or globally via the search head of the search support system. In some embodiments, this delete date may be defined by a user of the search support system. Such a user may be, for example, the owner of the data contained within the local data store. In other embodiments, this delete date may be defined by a deletion process of the search support system. For example, the deletion process may determine a delete date based on an amount of data contained within the local data store, or the search support system as a whole, exceeding a deletion threshold. In such an example, the deletion process may calculate the delete date to bring the amount of data to a point below the deletion threshold. As another example the deletion process may determine a deletion date based on an amount of available space within the local data store, or the search support system as a whole, dropping below a deletion threshold. In such an example, the deletion process may calculate the deletion date to bring the amount of space available to a point above the deletion threshold. Such a deletion process may be carried out, for example, by the search head or an indexer associated with local data store. As yet another example, the delete date may be updated for a local data store by the search head or the indexer of the local data store as data is deleted from the local data store. In such examples, the delete date may represent the oldest date for any data that is still available in the local data store. In other embodiments, the deletion date may be based on an archive date, such as that discussed below (e.g., deletion date is a set time period from the archive date). In still other embodiments, whether a subset of data is still available includes monitoring the subset of data to detect a deletion event, such as the deletion events described above in reference to FIG. 8. In response to detecting the deletion event updating a table of the search support system to reflect that the subset of data is being deleted and is no longer available. Once the table is updated, the indexer of a local data store on which the subset of data resides may delete the subset of data from the local data store.

As second examples, to determine that the subset of data is still available includes the search head determining whether the subset of data is older than a cut-off date. In some embodiments, the cut-off date may be a date prior to which the search system guarantees that data that has yet to exceed the cut-off date is still available in the local data store. Put another way, the cut-off date may be indicative of a date beyond which data will be deleted as necessary from the search support system. In contrast, data that has exceeded the cut-off date is not guaranteed to still be available and therefore the external data store would be utilized to satisfy the search request to ensure that as much data as possible is returned by the search request. In embodiments, this cut-off date may be a local cut-off date associated with the local data store, or an indexer of the local data store. In other embodiments, this cut-off date may be a global cut-off date associated with the search head or the search support system as a whole and may be applied uniformly across the indexers of the search support system. In some embodiments, this cut-off date may be defined by a user of the search support system. Such a user may be, for example, the owner of the data contained within the local data store. In other embodiments, this cut-off date may be defined by a cut-off process of the search support system. For example, in embodiments where the cut-off date is global, the search head or the individual indexers may monitor indexes of the search support system to detect a deletion event associated with one of those indexes. In response to detecting a deletion event with respect to a portion of data from one of those indexes, the respective indexer of the one index or the search head may update the global cut-off date of the search support system to reflect a date that precedes an earliest date associated with the portion of data being deleted. In such an embodiment, the cut-off date would merely indicate that at least some data within the search support system that is older than the cut-off date has been deleted. As such, the search support system may not be able to guarantee that the subset of data is still available if the subset of data is older than the cut-off date. Such a cut-off process may be carried out, for example, by the search head or an indexer associated with local data store.

As third examples, the search head may initially determine that the subset of data has been archived based on whether the subset of data is older than an archive date. This archive date may be associated with the local data store. Such an association may be accomplished locally via the indexer that manages the local data store or globally via the search head of the search support system. In some embodiments, this archive date may be defined by a user of the search support system. Such a user may be, for example, the owner of the data contained within the local data store. In other embodiments, this archive date may be defined by an archiving process of the search support system. For example, the archiving process may determine an archive date based on an amount of data contained within the local data store, or the search support system as a whole, exceeding an archive threshold. In such an example, the archiving process may calculate the archive date to bring the amount of data to a point below the archive threshold. As another example the archiving process may determine an archive date based on an amount of available space within the local data store, or the search support system as a whole, dropping below an archive threshold. In such an example, the archiving process may calculate the archive date to bring the amount of space available to a point above the archive threshold. Such an archiving process may be carried out, for example, by the search head or an indexer associated with local data store. This archive date may be utilized in determining the deletion date or the cut-off date discussed above, as such the archive date may be utilized in determining availability of the data.

In fourth examples, the search head may query the indexer of the subset of data to determine if the subset of data still exists in the local index of the indexer.

Once it is determined that the subset of data is available in the local data store, the search request may be executed on the subset of data utilizing the local data store. Such a process may be performed by one or more indexers of the search support system that are associated with the subset of data. In such embodiments the search head may initiate each indexer of the one or more indexers to execute the search request.

In embodiments, the subset of data comprises event data that includes a plurality of events. Each event may include a timestamp associated with raw data, such as that discussed previously. In such embodiments, executing the search request on the subset of data may include applying extraction rules that specify how to extract values from the plurality of events. In embodiments, these extraction rules may be defined by regular expressions. In some embodiments, executing the search request on the subset of data includes applying a late binding schema to the plurality of events. In such embodiments, the late binding schema may be associated with one or more extraction rules that are based on the search request.

2.3 Illustrative Data Timeline

Figure 10:
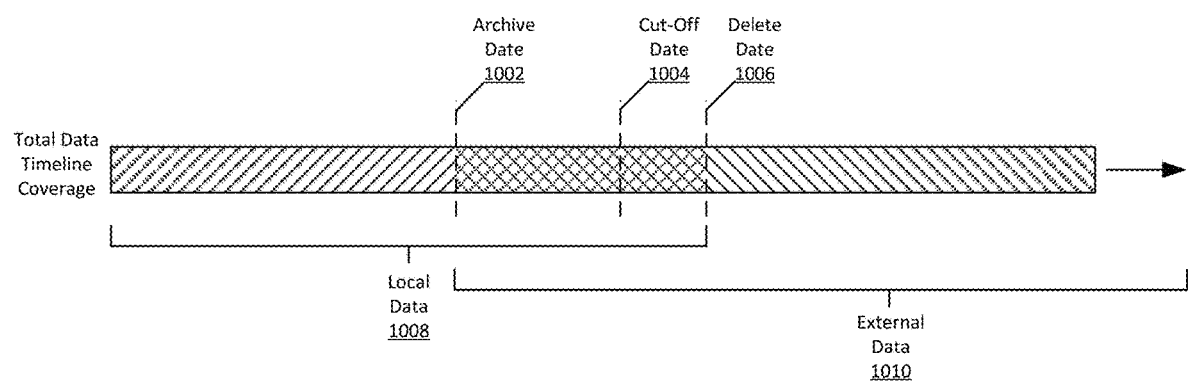
FIG. 10 depicts an illustrative data timeline for data of a search support system in accordance with various embodiments of the present disclosure.

FIG. 10 depicts an illustrative data timeline for data of a search support system in accordance with various embodiments of the present disclosure. As depicted movement to the left along the timeline provides for more recent data, while movement to the right along the timeline provides for less recent, or older, data. Archive date 1002 is indicative of a date at which data is archived from local data 1008 to external data 1010. In embodiments, archive date 1002 may be determined as discussed above in reference to FIG. 9. Delete date 1006 is indicative of a date at which data is deleted from the local data store. In embodiments, delete date 1006 may be determined as discussed above in reference to FIG. 9. As a result of the above, local data 1008 and external data 1010 overlap for data that is older than archive date 1002, but prior to the delete date 1006. This overlapping period is depicted by the cross-hatching between these two dates. The overlapping period represents a subset of data that exists in both local data 1008 and external data 1010; however, the subset of data is not equal to the local data 1008 or the external data 1010. As such, the overlapping period represents a subset of data that lies within the intersection of the local date 1008 and the external data 1010, where the subset of data is a proper subset with respect to both the local date 1008 and the external data 1010.

In embodiments that utilize the delete date to determine whether a subset of data, that has been archived, is still available in local data 1008, any data falling between the archive date 1002 and the delete date 1006 would be considered to be available in local data 1008 and thus, the local data 1008 will be searched for that portion of data. Any data prior to the archive date 1002 only exists in local data 1008; therefore, any data that falls within this time period would of course be searched within the local data 1008. Any data that is older than the delete date 1006 only exists in external data 1010, therefore any data that falls within this time period would of course be searched within the external data 1010.

In embodiments that utilize a cut-off date for determining whether data is still available in local data 1008, cut-off date 1004 is indicative of a date after which data is considered to be no longer available within the local data 1008, even though, as indicated the data may still exist in local data 1008. This is because, as discussed previously, the delete date 1006 may be local to an indexer of the search support system, while the cut-off date 1004 may be global to a search head of the search support system. In addition, the delete date 1006 may be dependent not only on time, but amount of data contained within the local data store. As a result, the delete date may move. Because the delete date is local to the indexers, the search head may not be aware of the delete date 1006 and instead would rely on the cut-off date 1004. As a result, the search head may limit the portion of local data 1008 that is searched to that time period where no date has been deleted from the local indexes. Put another way the search head may limit the portion of local data 1008 that is searched to that time period where all data is still available from the local indexes. These two time periods are one and the same and are reflected by cut-off date 1004. As such, any data falling between the archive date 1002 and the cut-off date 1004 would be considered to be available and thus, the local data 1008 will be searched for that portion of data. Any data prior to the archive date 1002 only exists in local data 1008; therefore, any data that falls within this time period would, of course, be searched within the local data 1008. Any data that is older than the cut-off date 1006 is only considered to be available from external data 1010; therefore any data that falls within this time period would of course be searched within the external data 1010.

2.4 Illustrative Hardware System

The systems and methods described above may be implemented in a number of ways. One such implementation includes computer devices having various electronic components. For example, components of the system in FIG. 8 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 11:
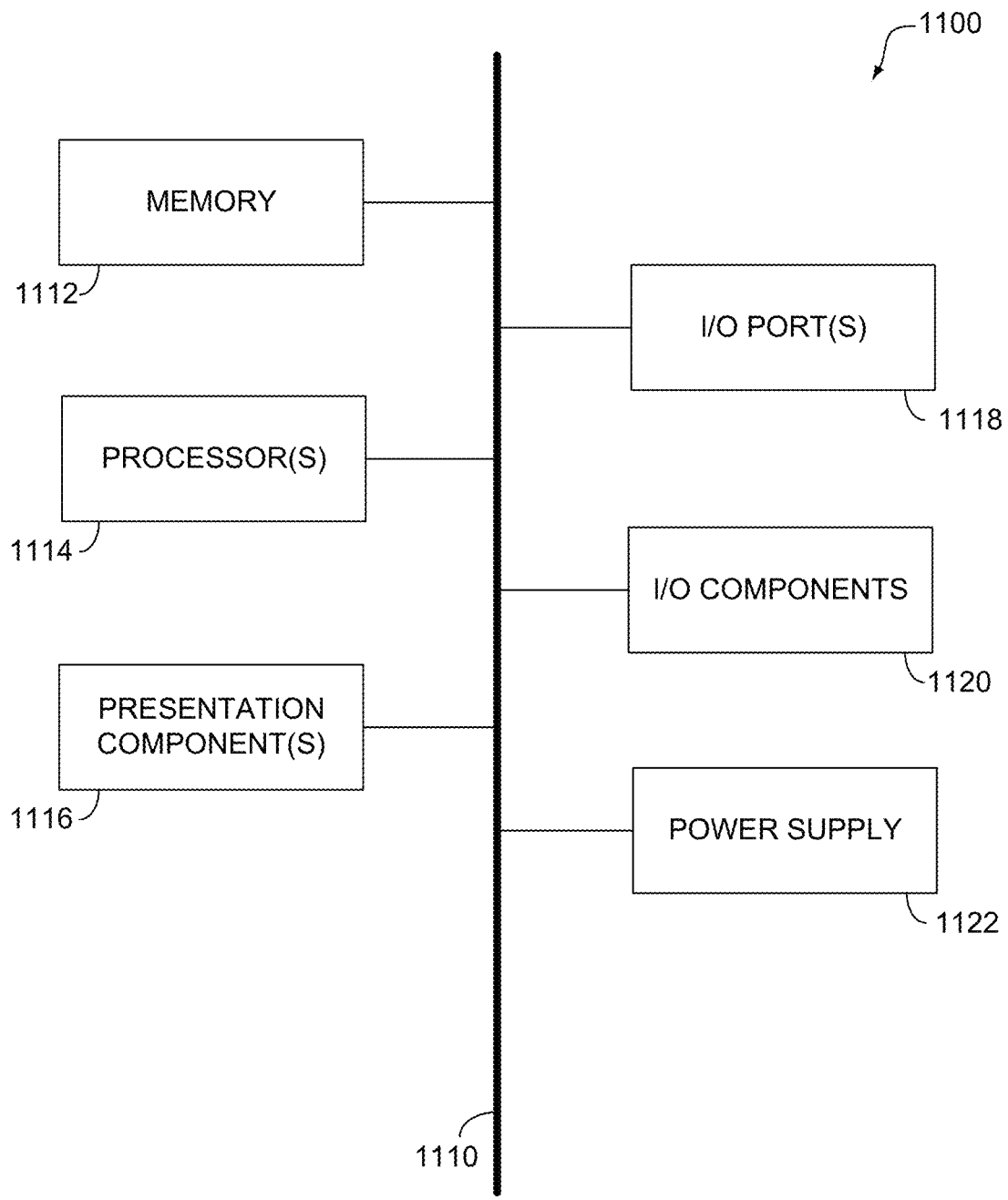
FIG. 11 is a block diagram of an example computing device in which embodiments of the present disclosure may be employed.

An example operating environment in which embodiments of the present invention may be implemented is described below in order to provide a general context for various aspects of the present invention. Referring to FIG. 11, an illustrative operating environment for implementing embodiments of the present invention is shown and designated generally as computing device 1100. Computing device 1100 is but one example of a suitable operating environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialized computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, I/O components 1120, and an illustrative power supply 1122. Bus 1110 represents what may be one or more busses (such as, for example, an address bus, data bus, or combination thereof). Although depicted in FIG. 11, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 1116 while also being one of the I/O components 1120. As another example, processors have memory integrated therewith in the form of cache; however, there is no overlap depicted between the one or more processors 1114 and the memory 1112. A person of skill in the art will readily recognize that such is the nature of the art, and it is reiterated that the diagram of FIG. 11 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 1100 of FIG. 11 and any other reference to "computing device," unless the context clearly indicates otherwise.

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 1100 includes one or more processors 1114 that read data from various entities such as memory 1112 or I/O components 1120. Presentation component(s) 1116 present data indications to a user or other device. Illustrative presentation components include a display device, speaker, printing component, vibrating component, etc.

I/O ports 1118 allow computing device 1100 to be logically coupled to other devices including I/O components 1120, some of which may be built in. Illustrative components include a keyboard, mouse, microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion.

As can be understood, implementations of the present disclosure provide for various approaches to data processing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A method comprising:
maintaining, by one or more computing devices of a search support system, an archive date that is independent of querying and indicates that any data that is in a first data store and that was stored in the first data store before the archive date is archived data that has been archived to a second data store and exists in both the first data store and the second data store;
maintaining, by the one or more computing devices of the search support system, a cut-off date that is independent of querying, before the archive date, and indicates that any data that was stored in the first data store after the cut-off date, including a subset of the archived data that has been archived to the second data store, is available in the first data store;
querying, by the one or more computing devices, the first data store for a first portion of requested data based on a determination that the first portion of requested data was stored in the first data store after the cut-off date; and
providing, by the one or more computing devices, search results comprising the first portion of the requested data.

2. The method of claim 1, further comprising maintaining, by the search support system, a delete date that is before the cut-off date and indicates that the first data store does not have any available data that was stored in the first data store before the delete date.

3. The method of claim 1, further comprising maintaining, by the search support system, a delete date that is before the cut-off date and indicates that the first data store does not have any available data that was stored in the first data store before the delete date, wherein the search support system is configured to cause deletion, based on detecting a deletion triggering event, of at least a portion of the archived data in the first data store that was stored in the first data store before the cut-off date and after the delete date.

4. The method of claim 1, further comprising determining to query to the second data store for a second portion of requested data based on determining that the second portion of requested data was stored in the first data store before the cut-off date.

5. The method of claim 1, wherein the search support system is configured to cause deletion, based on detecting a deletion triggering event, of at least a portion of the archived data in the first data store that was stored in the first data store more than a set duration of time before the archive date.

6. The method of claim 1, wherein the search support system is configured to cause deletion, based on detecting a deletion triggering event, of at least a portion of the archived data in the first data store that was stored in the first data store more than a set duration of time before the archive date, the method further comprising updating, by an archiving process of the search support system and based on a determination that the first data store has an amount of stored data that exceeds a threshold amount of data, the archive date to an updated archive date that would reduce the stored data in the first data store below the threshold amount of data.

7. The method of claim 1, wherein the cut-off date is global to a plurality of data stores of the search support system, the method further comprising, upon detecting a deletion triggering event configured to cause deletion of a portion of data from one of the data stores, updating the cut-off date based at least on an earliest date associated with the portion of data being deleted.

8. A computer system comprising:
one or more processors; and
one or more computer-readable storage media containing instructions which, when executed by the one or more processors, cause the one or more processors to perform operations comprising:
maintaining, by one or more computing devices of a search support system, an archive date that is independent of querying and indicates that any data that is in a first data store and that was stored in the first data store before the archive date is archived data that has been archived to a second data store and exists in both the first data store and the second data store;
maintaining, by the one or more computing devices of the search support system, a cut-off date that is independent of querying, before the archive date, and indicates that any data that was stored in the first data store after the cut-off date, including a subset of the archived data that has been archived to the second data store, is available in the first data store;
querying, by the one or more computing devices, the first data store for a first portion of requested data based on a determination that the first portion of requested data was stored in the first data store after the cut-off date; and
providing, by the one or more computing devices, search results comprising the first portion of the requested data.

9. The computer system of claim 8, the operations further comprising maintaining, by the search support system, a delete date that is before the cut-off date and indicates that the first data store does not have any available data that was stored in the first data store before the delete date.

10. The computer system of claim 8, the operations further comprising maintaining, by the search support system, a delete date that is before the cut-off date and indicates that the first data store does not have any available data that was stored in the first data store before the delete date, wherein the search support system is configured to cause deletion, based on detecting a deletion triggering event, of at least a portion of the archived data in the first data store that was stored in the first data store before the cut-off date and after the delete date.

11. The computer system of claim 8, the operations further comprising determining to query to the second data store for a second portion of requested data based on determining that the second portion of requested data was stored in the first data store before the cut-off date.

12. The computer system of claim 8, wherein the search support system is configured to cause deletion, based on detecting a deletion triggering event, of at least a portion of the archived data in the first data store that was stored in the first data store more than a set duration of time before the archive date.

13. The computer system of claim 8, wherein the search support system is configured to cause deletion, based on detecting a deletion triggering event, of at least a portion of the archived data in the first data store that was stored in the first data store more than a set duration of time before the archive date, the operations further comprising updating, by an archiving process of the search support system and based on a determination that the first data store has an amount of stored data that exceeds a threshold amount of data, the archive date to an updated archive date that would reduce the stored data in the first data store below the threshold amount of data.

14. The computer system of claim 8, wherein the cut-off date is global to a plurality of data stores of the search support system, the operations further comprising, upon detecting a deletion triggering event configured to cause deletion of a portion of data from one of the data stores, updating the cut-off date based at least on an earliest date associated with the portion of data being deleted.

15. One or more computer-storage media having instructions which, when executed by one or more processors, cause the one or more processors to perform operations comprising:
maintaining, by one or more computing devices of a search support system, an archive date that is independent of querying and indicates that any data that is in a first data store and that was stored in the first data store before the archive date is archived data that has been archived to a second data store and exists in both the first data store and the second data store;
maintaining, by the one or more computing devices of the search support system, a cut-off date that is independent of querying, before the archive date, and indicates that any data that was stored in the first data store after the cut-off date, including a subset of the archived data that has been archived to the second data store, is available in the first data store;
querying, by the one or more computing devices, the first data store for a first portion of requested data based on a determination that the first portion of requested data was stored in the first data store after the cut-off date; and
providing, by the one or more computing devices, search results comprising the first portion of the requested data.

16. The one or more computer-storage media of claim 15, the operations further comprising maintaining, by the search support system, a delete date that is before the cut-off date and indicates that the first data store does not have any available data that was stored in the first data store before the delete date.

17. The one or more computer-storage media of claim 15, the operations further comprising maintaining, by the search support system, a delete date that is before the cut-off date and indicates that the first data store does not have any available data that was stored in the first data store before the delete date, wherein the search support system is configured to cause deletion, based on detecting a deletion triggering event, of at least a portion of the archived data in the first data store that was stored in the first data store before the cut-off date and after the delete date.

18. The one or more computer-storage media of claim 15, the operations further comprising determining to query to the second data store for a second portion of requested data based on determining that the second portion of requested data was stored in the first data store before the cut-off date.

19. The one or more computer-storage media of claim 15, wherein the search support system is configured to cause deletion, based on detecting a deletion triggering event, of at least a portion of the archived data in the first data store that was stored in the first data store more than a set duration of time before than the archive date.

20. The one or more computer-storage media of claim 15, wherein the search support system is configured to cause deletion, based on detecting a deletion triggering event, of at least a portion of the archived data in the first data store that was stored in the first data store more than a set duration of time before the archive date, the operations further comprising updating, by an archiving process of the search support system and based on a determination that the first data store has an amount of stored data that exceeds a threshold amount of data, the archive date to an updated archive date that would reduce the stored data in the first data store below the threshold amount of data.

* * * * *